US012457442B2

(12) United States Patent
Hsu et al.

(10) Patent No.: US 12,457,442 B2
(45) Date of Patent: Oct. 28, 2025

(54) SYSTEM AND METHOD OF WIRELESS HEADSET

(71) Applicant: RelaJet Tech (Taiwan) Co., Ltd., Taipei (TW)

(72) Inventors: Yun-Shu Hsu, Taipei (TW); Po-Ju Chen, Taipei (TW)

(73) Assignee: RelaJet Tech (Taiwan) Co., Ltd., Taipei (TW)

( * ) Notice: Subject to any disclaimer, the term of this patent is extended or adjusted under 35 U.S.C. 154(b) by 216 days.

(21) Appl. No.: 18/024,981

(22) PCT Filed: Sep. 9, 2021

(86) PCT No.: PCT/US2021/049610
§ 371 (c)(1),
(2) Date: Mar. 7, 2023

(87) PCT Pub. No.: WO2022/056093
PCT Pub. Date: Mar. 17, 2022

(65) Prior Publication Data

US 2023/0336903 A1 Oct. 19, 2023

Related U.S. Application Data

(60) Provisional application No. 63/076,329, filed on Sep. 9, 2020.

(51) Int. Cl.

| | |
|---|---|
| ***H04R 1/10*** | (2006.01) |
| ***H04M 1/05*** | (2006.01) |
| ***H04R 5/033*** | (2006.01) |
| ***H04R 25/00*** | (2006.01) |

(52) U.S. Cl.
CPC ......... *H04R 1/1041* (2013.01); *H04R 1/1025* (2013.01); *H04R 1/1083* (2013.01); *H04R 1/1016* (2013.01)

(58) Field of Classification Search
None
See application file for complete search history.

(56) References Cited

U.S. PATENT DOCUMENTS

| | | | | |
|---|---|---|---|---|
| 6,230,029 | B1 | 5/2001 | Hahn et al. | |
| 9,877,098 | B1 * | 1/2018 | Riley ...................... | H04R 5/033 |
| 2008/0076489 | A1 | 3/2008 | Rosener et al. | |
| 2010/0111349 | A1 | 5/2010 | Devlas et al. | |
| 2010/0245585 | A1 | 9/2010 | Fisher et al. | |
| 2014/0126756 | A1 * | 5/2014 | Gauger, Jr. ...... | G10K 11/17857 381/71.6 |
| 2014/0270228 | A1 | 9/2014 | Oishi et al. | |
| 2015/0222977 | A1 * | 8/2015 | Angel, Jr. .............. | H04R 1/105 381/74 |
| 2016/0165381 | A1 | 6/2016 | Kapoor et al. | |
| 2020/0004027 | A1 | 1/2020 | Grootjans et al. | |

FOREIGN PATENT DOCUMENTS

| | | |
|---|---|---|
| CN | 103546181 A | 1/2014 |

* cited by examiner

*Primary Examiner* — Qin Zhu
(74) *Attorney, Agent, or Firm* — C. Jason Liang

(57) ABSTRACT

The present invention provides a wireless headset device/system comprising a battery module, a control module and a receiver module wherein said battery module is detachable and connected to said control module; and said receiver module is detachable and connected to said control module.

18 Claims, 4 Drawing Sheets

SYSTEM AND METHOD OF WIRELESS HEADSET

BACKGROUND OF THE INVENTION

Headphones traditionally refer to a pair of small loudspeaker drivers worn on or around the head over a user's ears. They are electroacoustic transducers, which convert an electrical signal to a corresponding sound. Headphones are also known as earspeakers, earphones, or earbuds. There are several types of headphones/earbuds. Typically, earbuds consist of individual units that plug into the user's ear canal. Another type of headphones are bone conduction headphones, which typically wrap around the back of the head and rest in front of the ear canal, leaving the ear canal open.

A headset is a headphone combined with a microphone. Headsets provide the equivalent functionality of a telephone handset with hands-free operation. In the context of telecommunication, a headset is a combination of headphone and microphone. Headsets are made with either a single-earpiece (mono) or a double-earpiece (mono to both ears, or stereo). The microphone arm of headsets is either an external microphone type where the microphone is held in front of the user's mouth, or a voice-tube type where the microphone is housed in the earpiece and speech reaches it by means of a hollow tube.

Recently, headsets with active noise-cancelling headphones are very popular. Active noise-cancelling headphones use a microphone, amplifier, and speaker to pick up, amplify, and play ambient noise in phase-reversed form; this to some extent cancels out unwanted noise from the environment without affecting the desired sound source, which is not picked up and reversed by the microphone.

SUMMARY OF THE INVENTION

In one aspect provides a modularized wireless headset device/system comprising a battery module, a control module and a receiver module wherein said battery module is detachable and connected to said control module; and said receiver module is detachable and connected to said control module.

In another aspect provides a method for the design and assembling of the wireless modularized headset device/system disclosed herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
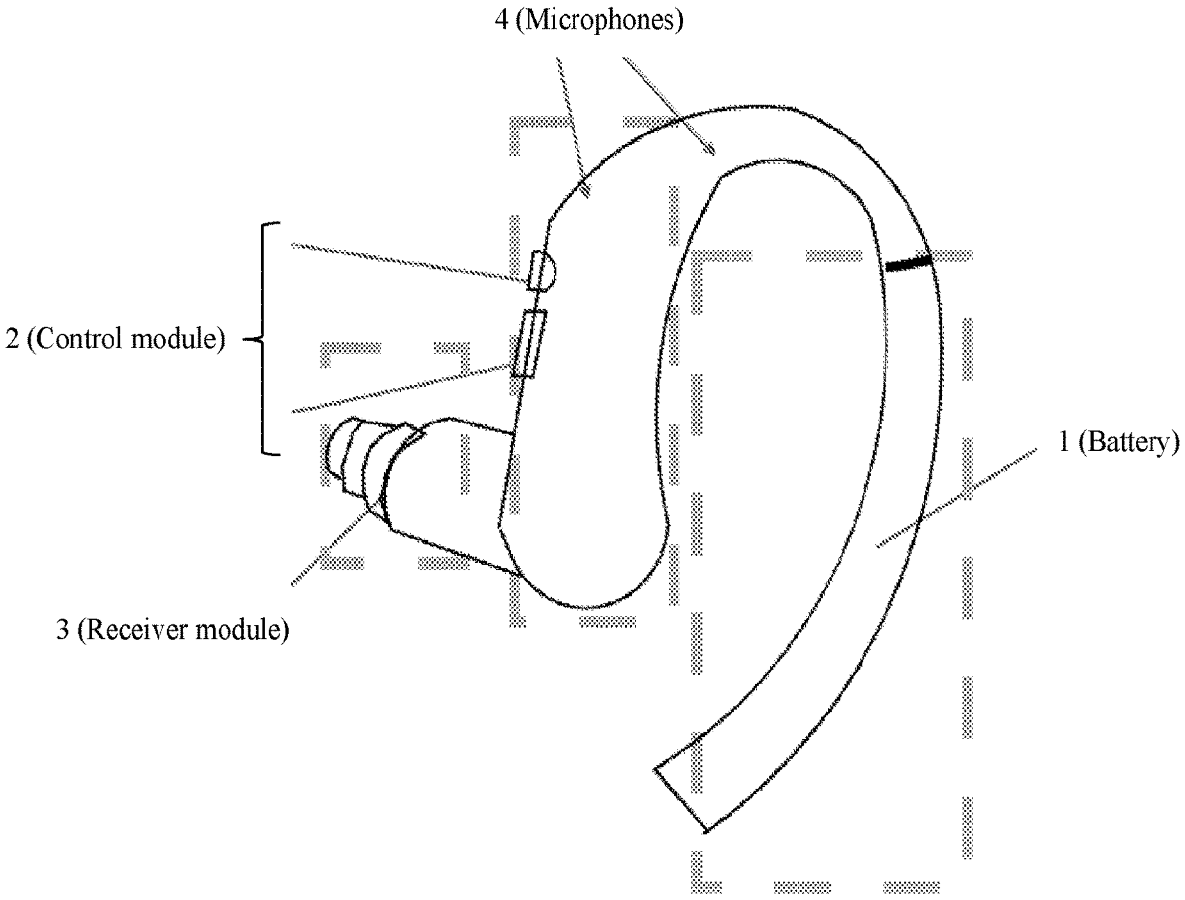
FIG. 1 illustrates an exemplary modularized wireless headset device/system comprising a battery module, a control module comprising a microphone and a control unit, and a receiver module.

Reference in the specification to "a specific embodiment" or a similar expression means that a particular feature, structure, or characteristic described in connection with the specific embodiment is included in at least one specific embodiment of the present invention. Therefore, in this specification, the appearance of the terms "in a specific embodiment" and similar expressions does not necessarily refer to the same specific embodiment.

A headset is a headphone with a microphone. People can listen to sound with headphone and can record sound with a microphone. Headsets have many uses including in call centers, telephone operators, military and law enforcement communications staff, and other telephone-intensive jobs. They are also used by in homes by people wishing to have both hands free during a telephone conversation or used as hearing aids. Headsets can also be used in closed circuit communication systems, such as when an audio engineer communicates with band members in a recording studio using the mixing desk.

Headsets normally have only one speaker like a telephone, but also can be made with speakers for both ears. A wireless headset can be put in a pocket or a bag easily due to its small size. However, a wireless headset requires a battery to operate its functions. Typically, the build in small battery is recharged by an external power source. When the battery of a wireless headset is out of order or drained, the headset becomes unusable. Moreover, with such a small size, the functionality of a headset is limited to its fixed design where a user needs to consider before putting the wireless headset to use. There are so many different wireless headsets a consumer may purchase based on the needs of audio quality, battery size, microphone receiver quality and other considerations.

However, it would be economically impractical to purchase so many wireless headsets just so the consumer can use the headsets under different considerations. The impracticality to have many headsets manifests, for example, when one is in need of wearing hearing aids. Typically, the cost of a hearing aid ranges from $1,000 dollars to $5,000 or more. Aside when one needs to purchase a new hearing aid due to the failure of the old one, the person may need to purchase a new set because of the change in hearing and/or health conditions; the wear and tear of the old hearing aids; the change of the hearing aid technology (e.g., an upgrade of a better receiver), and or the change of the person's financial situation (making him/her want to upgrade the hearing aids). Each purchase will be another cost of $1,000 dollars to $5,000 or more. If the headset is modularized and the components can be replaceable/upgradable, one can save significant money, not to mention to find the better fit of one's needs in most if not all of his desired purposes.

Thus, there is in needs of a modularized wireless headset device/system allowing switching (replacing) of the size of battery (or the type of battery), the different quality/functions of microphones or receivers and/or other special or desired accessory module for a specific need. In some embodiments, the invention headset device/system may be a hearing aid device or system.

In some embodiments provide a modularized wireless headset device or system comprising a battery module, a control module and a receiver module wherein said battery module is detachable and connected to said control module; and said receiver module is detachable and connected to said control module. In some embodiments, the battery module comprises a rechargeable battery or a disposable battery. In some embodiments, the battery module comprises a replaceable battery which is rechargeable or disposable. In some embodiments, the control module comprises a control unit, which provides controls over the volume of audio outputs, environmental mode selection, denoise levels selection and other desired controllable functions. In some embodiments, the battery module is connected to the control module via a joint. In certain embodiments, said joint is configured in a way to confirm the successful connection between the battery module and the control module. In certain embodiments, said successful connection is confirmed by a clicking sound, a light, or other suitable indication means. In certain embodiments, said joint is configured to be a micro USB type, a type C USB, a lighting connector, or the like. In certain embodiments, said joint is configured to have a first connector on the control module and a second connector on the battery module. In certain embodiments, the first connector on the control module is a female connector and the second connector on the battery module is a male connector. In certain embodiments, the first connector on the control module is a male connector and the second connector on the battery module is a female connector. In some embodiments, the control module provides indication of the battery power level. In some embodiments, the receiver module comprises a receiver. In certain embodiments, the receiver uses a balanced armature driver, a dynamic driver, or the like. In some embodiments, the receiver module is configured to attach to the control module by a twist action. In some embodiments, the receiver module is connected to the control module via plug and receptacle connectors. In some embodiments, the control module comprises a control unit and/or a data processing unit.

In some embodiments, the device or system further comprises an accessory module detachable and connected to said battery module. In certain embodiments, the battery module further comprises an accessory module. In some embodiments, the device or system further comprises an accessory module incorporated within the battery module or connected via an electrical wire. In certain embodiments, the accessory module comprises an audio processing chip, one or more microphones, a data storage component storing recoding data, or a data processing component configured to process data from the control module. In certain embodiments, said one or more microphones comprise a Bluetooth microphone, or an array of microphones used as a surrounding sound purpose. In certain embodiments, said data processing component is configured to process data for voice recognition.

FIG. 1 illustrates an exemplary modularized wireless headset device/system comprising a battery module 1, a control module 2 comprising a microphone 4 and a control unit, and a receiver module 3. In some embodiments, the battery module is switchable (replaceable) and detachable from the headset. In certain embodiments, the battery module comprises a rechargeable battery. In certain embodiments, the battery module comprises a replaceable battery which is rechargeable or disposable. In some embodiments, the control module comprises a control unit and/or a data processing unit. In some embodiments, the control module comprises one or more microphones from the far end (of the control module connecting point) of the receiver module. The control module comprises a control unit, which provides controls over the volume of audio outputs, environmental mode selection, denoise levels selection and other desired controllable functions a skilled person in the art deemed suitable. In some embodiments, the invention modularized device/system comprises a receiver module connected to the control module. The receiver module is replaceable and switchable with various desired receivers. For example, when a wireless headset is a hearing aid device, the receiver module may be switchable with the proper receivers for a person with mild, moderate, or severe hearing loss accordingly.

It should be readily recognized in the field that the invention device or system supports a variety of Bluetooth protocols including e.g., A2DP (Advanced Audio Distribution Protocol), AVRCP (Audio/Video Remote Control Protocol), HFP/HSP (Hands Free Protocol/Head Set Protocol), or other Bluetooth protocols. Any data may be communicated via the Bluetooth protocols between the wireless headsets to a mobile phone, a computer, or any devices capable of processing the data communicated from the device or system.

Figure 2A:
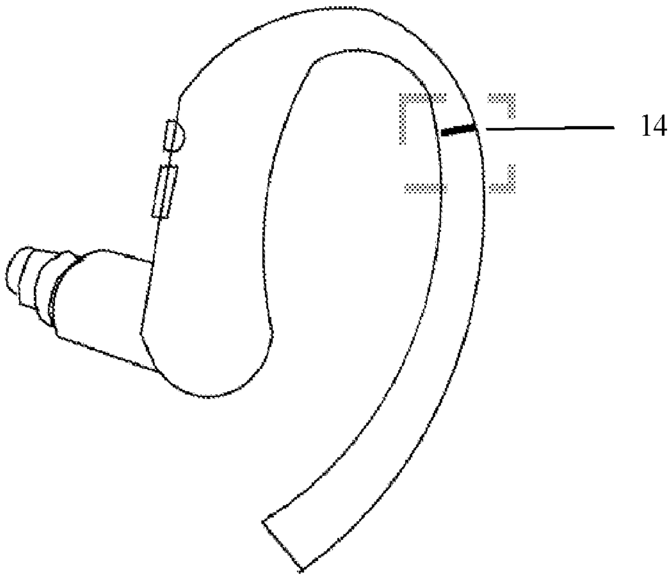
FIG. 2A/B show exemplary illustrations of where (2A) and how (2B) a battery module connected to the control module.
Figure 2B:
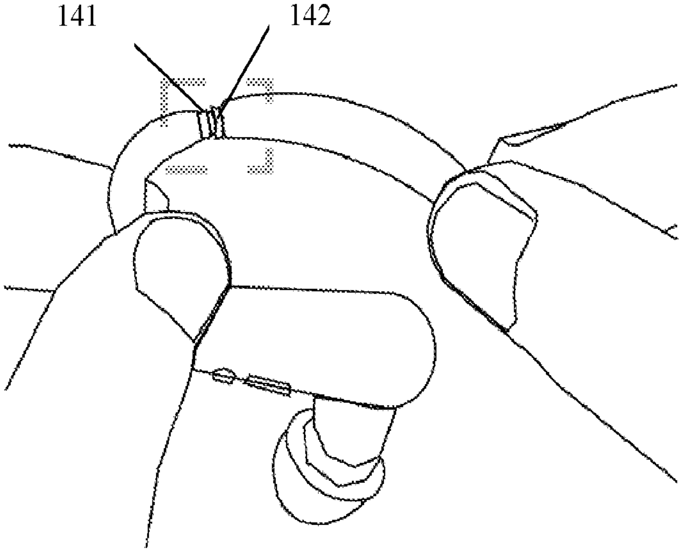

FIG. 2A provides an exemplary design where a joint/interface 14 is used to connect the battery module with the control module. The joint 14 is used for coupling and decoupling between the control module and the battery module. The joint 14 is configured in a way, e.g., with a clicking sound, a light, or other proper indication means, to confirm the successful connection between the battery module and the control module. FIG. 2B further illustrates how a joint works, for example by a first connector 141 and a second connector 142. In some embodiments, the first connector 141 on the control module is a female connector and the second connector on the battery module is a male connector of e.g., the type C USB or micro USB connectors, or the like. In some embodiments, the first connector 141 is a male connector and the second connector 142 is female connector such as a type C USB or micro USB connectors. It is readily recognized by a skilled person in the art to use other type of connectors such as the connectors used in the Apple products (e.g., iPhone, iPad, and other Apple products). The control module in some embodiments provide indication of the battery power level. When the battery is drained or about to get drained, the user can easily and quickly switch with a fully charged battery module or plug in the battery module to any suitable power sources (such as a power bank, a computer, a laptop, a suitable power source cable connected to any suitable power sources). In certain condition, the wireless headset may also transfer any data from the control module such as a recording data via the microphones to a computer or the like device for a direct data transfer via either micro USB, a type C USB, or other similar data transferring means (e.g., an Apple smartphone compatible data transfer means) through the joint 14. A device firmware, and/or software may be updated via the same connector after removing the battery module to a computer or the like.

Figure 3A:
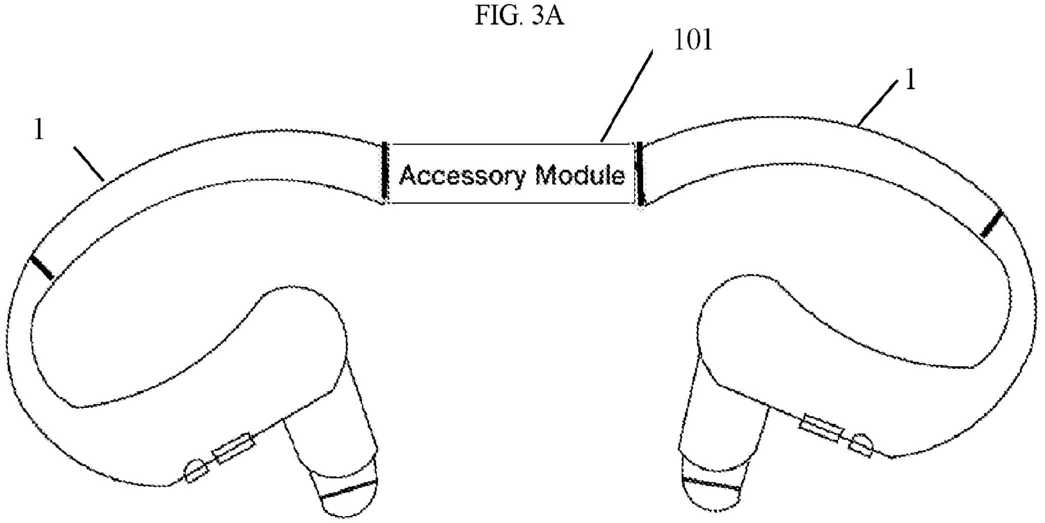
FIG. 3A/B show exemplary illustrations of an accessory module directly linked to the battery modules of both earbuds (3A), or indirectly linked (via a communication means) to the battery modules of both earbuds (3B).
Figure 3B:
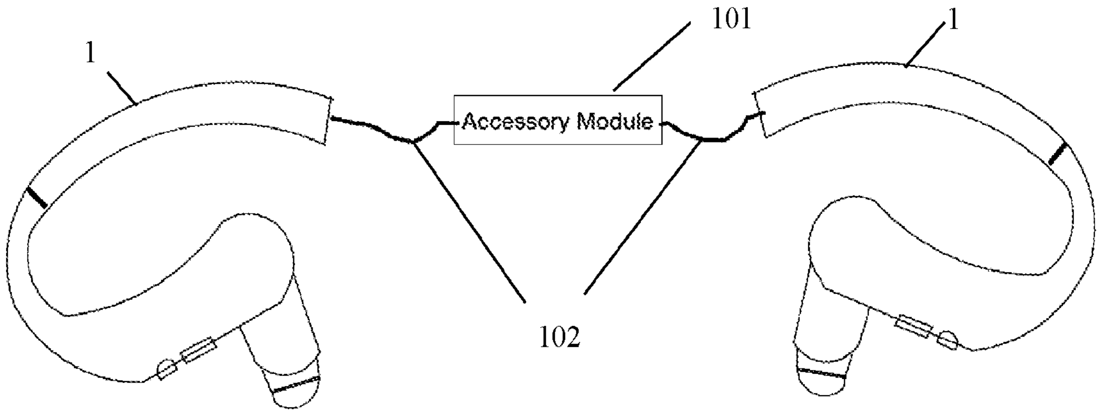

In some embodiments, as exemplified in FIG. 3A and FIG. 3B, the invention device/system further comprises an accessory module (101) incorporated within the battery module 1 (see 3A) or connected via an electrical wire 102 (or other suitable means for communicating the signal from the accessory module) separately to the battery modules 1 (see 3B). In some embodiments, the accessory module comprises an audio processing chip, one or more microphone (e.g., a Bluetooth microphone, or an array of microphones used as a surrounding sound purpose), a data storage component storing data from the long-term recordings, or a data processing component configured to process data from the control module for a special need such as voice recognition, or the like.

Figure 4A:
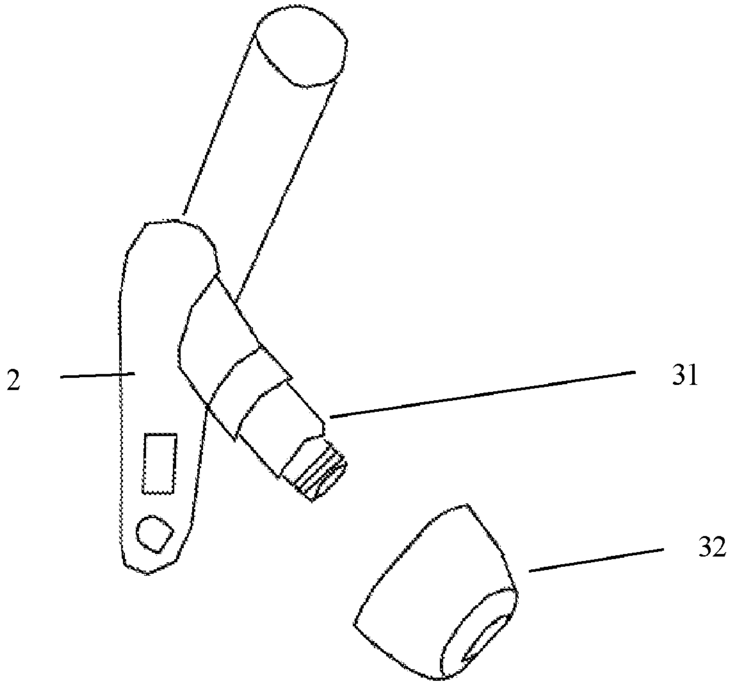
FIG. 4A/B show exemplary illustrations of where (4A) and how (4B) a receiver module is connected to the control module.
Figure 4B:
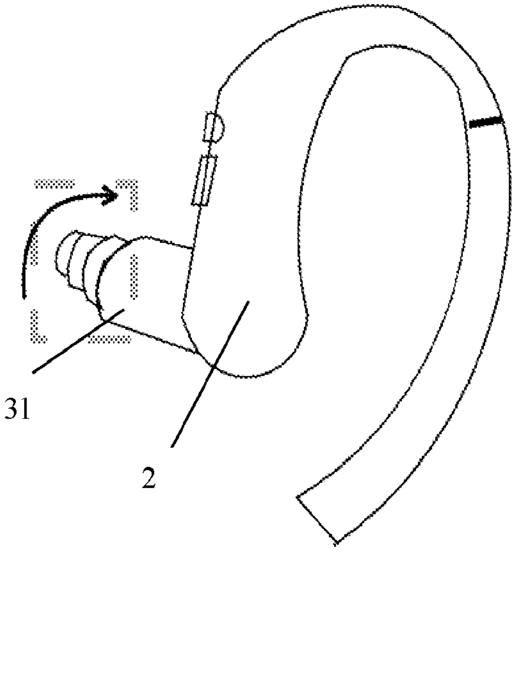

FIG. 4A and FIG. 4B show exemplary illustrations of where (4A) and how (4B) a receiver module is connected to the control module. The invention modularized wireless headset provides a switchable receiver module 31 connected to the control module 2. In some embodiments, the receiver module comprises a receiver. In some embodiments, the receiver uses balanced armature driver, dynamic driver, or combinations thereof, allowing the user to find the proper and suitable receiver in accordance with the user's conditions (e.g., a person with mild, moderate, or severe hearing loss may choose different receiver accordingly to better fit his/her needs). The detached receiver module also allows users to easily clean up the receiver, unlike the traditional non-detachable receiver. The changeable ear tip 32 is mounted on top of the receiver module 31. In some embodiments, as illustrated in FIG. 4B, the receiver module 31 comprises a mechanism to attach to the control module 2 by a twist action. In other embodiments, the receiver module may be connected to the control module via other types of plug and receptacle connectors (not shown) readily recognized by a skilled person in art or as known in the field.

The description of the present invention may include flowcharts and/or block diagrams of systems, devices, methods and computer program products according to specific embodiments of the present invention. It is understood that each block in the flowchart and/or block diagram and any combination of blocks in the flowchart and/or block diagram, can be implemented using computer program instructions. These computer program instructions may be executed by a processor of a general-purpose computer or special computer, or a machine composed of other programmable data processing devices. These computer program instructions may also be stored on a computer-readable medium to instruct a computer or other programmable data processing device to perform a specific function, which includes instructions to implement the functions or operations described in the flowcharts and/or block diagrams. Computer program instructions can also be loaded on a computer or other programmable data processing device to facilitate a system operation step on the computer or other programmable device and execute the instructions on the computer or other programmable device. A computer-implemented program is generated from time to time to achieve the functions or operations illustrated in the flowcharts and/or block diagrams.

With the practice of the invention modularized wireless headsets, a huge economic benefit is achieved, as one can easily change any modules of the invention modularized wireless headsets for any reasons deems necessary. The practice of the invention modularized wireless headsets leading a commercial success is realized.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A modularized wireless headset device or system comprising a battery module, a control module, a receiver module and an accessory module incorporated within the battery module or connected via an electrical wire comprising a data processing component configured to process data from the control module for voice recognition, wherein said battery module is detachable and connected to said control module; and said receiver module is detachable and connected to said control module.

2. The modularized wireless headset device or system of claim 1, wherein the battery module comprises a rechargeable battery or a disposable battery.

3. The modularized wireless headset device or system of claim 1, wherein the battery module comprises a replaceable battery which is rechargeable or disposable.

4. The modularized wireless headset device or system of claim 1, wherein the control module comprises a control unit, which provides controls over the volume of audio outputs, environmental mode selection, denoise levels selection and other desired controllable functions.

5. The modularized wireless headset device or system of claim 1, wherein the battery module is connected to the control module via a joint.

6. The modularized wireless headset device or system of claim 5, wherein said joint is configured in a way to confirm the successful connection between the battery module and the control module.

7. The modularized wireless headset device or system of claim 6, wherein said successful connection is confirmed by a clicking sound, or a light.

8. The modularized wireless headset device or system of claim 5, wherein said joint is configured to be a micro USB type, a type C USB, or a lighting connector.

9. The modularized wireless headset device or system of claim 8, wherein said joint is configured to have a first connector on the control module and a second connector on the battery module.

10. The modularized wireless headset device or system of claim 9, wherein the first connector on the control module is a female connector and the second connector on the battery module is a male connector.

11. The modularized wireless headset device or system of claim 9, wherein the first connector on the control module is a male connector and the second connector on the battery module is a female connector.

12. The modularized wireless headset device or system of claim 1, wherein the control module provides indication of the battery power level.

13. The modularized wireless headset device or system of claim 1, wherein the receiver module comprises a receiver.

14. The modularized wireless headset device or system of claim 13, wherein the receiver uses a balanced armature driver or a dynamic driver.

15. The modularized wireless headset device or system of claim 1, wherein the receiver module is configured to attach to the control module by a twist action.

16. The modularized wireless headset device or system of claim 1, wherein the receiver module is connected to the control module via plug and receptacle connectors.

17. The modularized wireless headset device or system of claim 1, wherein the accessory module further comprises an audio processing chip, one or more microphones, or a data storage component storing recording data.

18. The modularized wireless headset device or system of claim 17, wherein said one or more microphones comprise a Bluetooth microphone, or an array of microphones used as a surrounding sound purpose.

* * * * *